United States Patent
Takeuchi

[19]

[11] Patent Number: 5,803,610
[45] Date of Patent: Sep. 8, 1998

[54] LINEAR BALL BEARING MOUNTING FLANGE AND FABRICATION OF LINEAR BALL BEARING WITH FLANGE

[75] Inventor: Mitsuo Takeuchi, Iwaki, Japan

[73] Assignee: Takeuchi Precision Works Co., Ltd., Fukushima-ken, Japan

[21] Appl. No.: 842,275

[22] Filed: Apr. 24, 1997

[30] Foreign Application Priority Data

Apr. 25, 1996 [JP] Japan .................................... 8-105303
Aug. 27, 1996 [JP] Japan .................................... 8-025267

[51] Int. Cl.$^6$ ..................................................... F16C 29/06
[52] U.S. Cl. ................................................. 384/43; 384/49
[58] Field of Search ................................. 384/43, 44, 45, 384/49

[56] References Cited

U.S. PATENT DOCUMENTS

| | | | |
|---|---|---|---|
| 3,588,200 | 6/1971 | Thomson | 384/49 |
| 5,230,567 | 7/1993 | Takeuchi | 384/43 |
| 5,244,282 | 9/1993 | Imai et al. | 384/43 |
| 5,564,835 | 10/1996 | Hirose et al. | 384/43 |

*Primary Examiner*—Thomas R. Hannon
*Attorney, Agent, or Firm*—Antonelli, Terry, Stout & Kraus, LLP

[57] ABSTRACT

A linear ball bearing mounting flange, which is provided on at least one end of an outer cylinder of a linear ball bearing and is used for mounting the linear ball bearing on a machine or apparatus. The flange includes a flange-shaped structure having a thick wall and provided separately from the outer cylinder. The flange-shaped structure has an annular recess extending from one end surface of the flange-shaped structure along the inner peripheral surface thereof; a peripheral wall on the inner peripheral side of the recess, which has a jagged structure in which projections and recesses are alternately arranged along the circumferential direction; and a claw projecting inward from the inner peripheral wall, which is formed at the leading end of each of the projecting portions of the jagged structure. When the flange is inserted around the outer cylinder of the linear ball bearing, the claws are locked in a claw insertion hole provided in the outer cylinder. Such a linear ball bearing mounting flange, which can be simply, easily mounted on the outer cylinder of the linear ball bearing, can be manufactured at a low cost.

4 Claims, 9 Drawing Sheets

5,803,610

LINEAR BALL BEARING MOUNTING FLANGE AND FABRICATION OF LINEAR BALL BEARING WITH FLANGE

BACKGROUND OF THE INVENTION

1. Field of the Invention

The present invention relates to a linear ball bearing mounting flange, and a method of fabricating a linear ball bearing with a flange.

2. Description of the Prior Art

Linear ball bearings have been extensively used for industrial robots, measuring devices, medical devices, computer terminal devices, and the like. In general, such a linear ball bearing has an annular groove provided around an outer periphery of each end portion of an outer cylinder, as disclosed in Japanese Patent Laid-open No. Hei 3-14907, wherein the linear ball bearing is mounted on a machine or apparatus by inserting the outer cylinder in a hole formed in the machine or apparatus and fixedly inserting an elastic ring or the like in the annular groove. In recent years, however, linear ball bearings of a different type have come to be widely used, in which a flange for mounting the bearing on a machine or apparatus is previously provided around an outer cylinder, wherein the linear ball bearing is mounted on the machine or apparatus by means of the flange mounted on the end portion of the outer cylinder.

In fabrication of such a linear ball bearing with a flange, a flange has been mounted on an outer cylinder of the linear ball bearing by screwing or brazing.

FIG. 11(a) is a view illustrating a method of mounting a flange on an outer cylinder of a bearing by screwing, and FIG. 11(b) is an enlarged view of an essential portion in FIG. 11(a); and FIG. 12(a) is a view illustrating a method of mounting the flange on the outer cylinder of the bearing by brazing; and FIG. 12(b) is an enlarged view of an essential portion in FIG. 12(a). In these figures, reference numeral 1 indicates an outer cylinder of a linear ball bearing; 2 is a linear ball bearing mounting flange having mounting holes 2a; 11 is a screw portion between the flange 2 and the outer cylinder 1; and 12 is a brazing portion between the flange 2 and the outer cylinder 1.

The screw portion used for mounting the flange on the linear ball bearing is obtained by screwing a threaded portion 1a formed around the outer cylinder 1 of the linear ball bearing with a threaded portion 2b formed around the flange 2.

The mounting method by screwing, however, has the following problems that:

(1) since an end portion 1b of the outer cylinder 1 of the linear ball bearing is structurally thinned, it is possibly cracked;

(2) the screw portion 11 is liable to be loosened when the linear ball bearing is applied with an impact force; and (3) when screwed around the outer cylinder, the flange is often bent, that is, the screwing angle of the flange cannot be kept constant, so that there occur variations in machining allowance in the step of machining the flanges at right angles, resulting in the poor productivity.

To solve the above problems of the mounting method by screwing, the mounting method by brazing has been adopted; however, such a method has also the following problems that:

(1) since the outer cylinder 1 is press-fitted in the flange 2, the inside diameter of the flange 2 and the outside diameter of the outer cylinder 1 must be finished at high accuracies respectively, resulting in the increased cost of each product;

(2) since being heat-treated together with the outer cylinder 1, the flange 2 is liable to be deformed, so that there occur variations in machining allowance in the step of machining the flanges at right angles, resulting in the poor productivity; and (3) the work for setting a brazing material in the brazing step must be performed for each product, resulting in the poor productivity.

In general, the flange integrated with the outer cylinder of the linear ball bearing has other problems that the outer periphery of the linear ball bearing cannot be continuously ground because of the presence of the flange; the assembling direction is limited because of the presence of the flange, resulting in the degraded workability; and since the linear ball bearing integrated with the flange has a T-shape, it is difficult to align the linear ball bearings in line because of the unstable postures when being transferred between fabrication steps.

SUMMARY OF THE INVENTION

To solve the above-described problems, the present invention has been made, and a main object of the present invention is to provide a linear ball bearing mounting flange which is simply, easily mounted on an outer cylinder of a linear ball bearing.

Another object of the present invention is to provide a linear ball bearing mounting flange produced at a low cost.

A further object of the present invention is to provide a method of fabricating a linear ball bearing with a flange simple and easy to be produced at a low cost.

To achieve the above objects, the present invention provides the following configurations:

(1) A linear ball bearing mounting flange, which is provided on at least one end of an outer cylinder of a linear ball bearing and is used for mounting the linear ball bearing on a machine or apparatus, the flange including: a flange-shaped structure having a thick wall and provided separately from the outer cylinder, the flange-shaped structure having an annular recess extending from one end surface of the flange-shaped structure along the inner peripheral surface thereof; a peripheral wall on the inner peripheral side of the recess, which has a jagged structure in which projections and recesses are alternately arranged along the circumferential direction; and a locking piece projecting inward from the inner peripheral wall, which is formed at the leading end of each of the projecting portions of the jagged structure.

(2) In a linear ball bearing with a flange described in (1), the flange-shaped structure includes at least three pieces of the projecting portions.

(3) In a linear ball bearing with a flange described in (1), the flange-shaped structure has a partially circular shape in a front view, in which two circular-arc portions are cut off from a circular shape by two straight lines parallel to each other.

(4) In a linear ball bearing with a flange described in (1), (2) of (3), the flange-shaped structure is made from a synthetic resin.

(5) A method of fabricating a linear ball bearing with a flange in which a flange is provided on at least one end of an outer cylinder of a linear ball bearing and is used for mounting the linear ball bearing on a machine or apparatus, including the steps of inserting the flange-shaped structure described in (1), (2) or (3) around an end portion of the outer cylinder and locking locking pieces of the flange-shaped structure in an annular groove provided around the outer cylinder.

(6) A method of fabricating a linear ball bearing with a flange in which a flange is provided on at least one end of an outer cylinder of a linear ball bearing and is used for mounting the linear ball bearing on a machine or apparatus, including the steps of inserting the flange-shaped structure described in (1), (2) or (3) around an end portion of the outer cylinder, engaging locking pieces of the flange-shaped structure in an annular groove provided around the outer cylinder, and press-fitting a wedge-like member in the annular groove for reinforcing the locking of the locking pieces with the annular groove.

(7) In a linear ball bearing described in (5) or (6), the flange-shaped structure is made from a synthetic resin.

In the linear ball bearing with a flange having the above-described configurations, when the flange is mounted around the outer cylinder of the linear ball bearing, the claws for fixing the flange to the outer cylinder are retreated by the spring-back effect in the recess formed in a mounting surface of the flange for mounting the flange to the outer cylinder and are inserted in the claw insertion hole of the outer cylinder, so that the flange is easily integrated with the outer cylinder. Accordingly, the linear ball bearing with a flange according to the present invention solves the problems of the prior art linear ball bearing with a flange which is mounted by screwing or brazing, and further it eliminates provision of a member such as a brazing material.

The method of fabricating the linear ball bearing with a flange according to the present invention solves not only the problems of the prior art fabrication method by screwing or brazing, but also other general problems caused by the integration of the flange with the linear ball bearing, for examples, the problems that the outer periphery of the linear ball bearing cannot be continuously ground because of the presence of the flange; the assembling direction is limited because of the presence of the flange, resulting in the degraded workability; and since the linear ball bearing integrated with the flange has a T-shape, it is difficult to align the linear ball bearings in line because of the unspecified postures when being transferred between fabrication steps. Moreover, the linear ball bearing with a flange fabricated by the method of the present invention is advantageous for heat-treatment on a large scale because only an outer cylinder of a linear ball bearing can be heat-treated and thereby takes a space smaller than that required for an outer cylinder integrated with a flange.

The linear ball bearing mounting flange according to the present invention, which is light in weight because the flange is made from a resin, is advantageous in that it can be simply, easily manufactured at a low cost.

Additionally, the linear ball bearing mounting flange of the present invention can simply, easily mounted on a linear ball bearing of a type having no flange.

As described above, the present invention exhibits large industrial effects. Concretely, the method of fabricating the linear ball bearing with a flange according to the present invention makes it possible to simply, easily mount an inexpensive linear ball bearing mounting flange on an outer cylinder of a linear ball bearing. The linear ball bearing mounting flange according to the present invention, which is made from a synthetic resin, can be simply, easily manufactured at a low cost. Thus, according to the present invention, the linear ball bearing with a flange can be simply, easily manufactured at a low cost.

DESCRIPTION OF THE PREFERRED EMBODIMENTS

Hereinafter, one embodiment of a linear ball bearing with a flange according to the present invention will be described with reference to the drawings.

Figure 1:
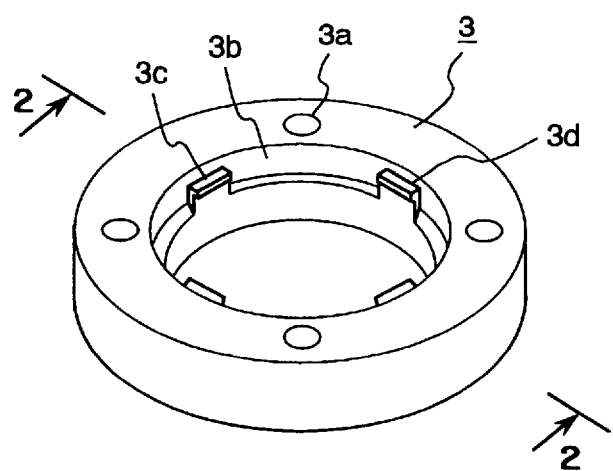
FIG. 1 is a perspective view of one embodiment of a linear ball bearing mounting flange according to the present invention.
Figure 2:
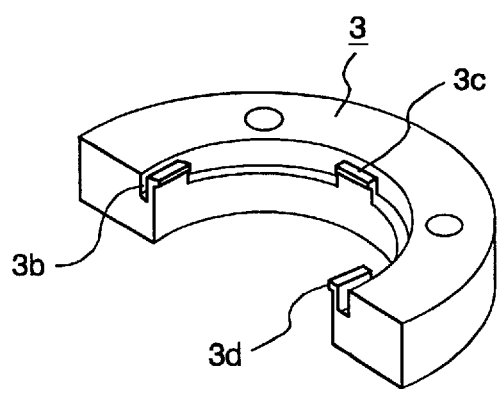
FIG. 2 is a sectional view taken on line A—A in FIG. 1.
Figure 3A:
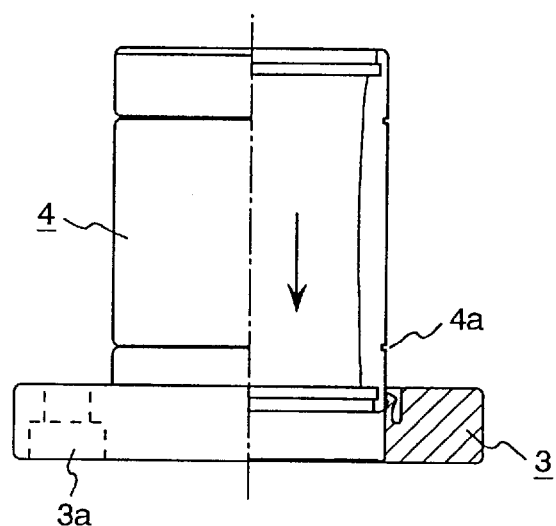
FIGS. 3(a) and 3(b) are views of one embodiment of a method of fabricating the linear ball bearing with a flange according to the present invention, illustrating a state in which claws are retreated in a recess.
Figure 3B:
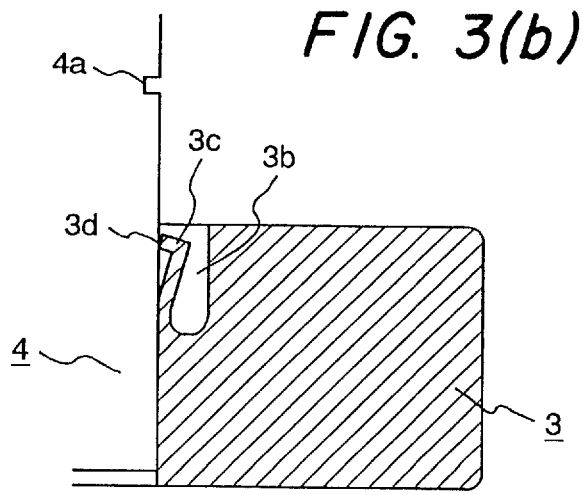
Figure 4A:
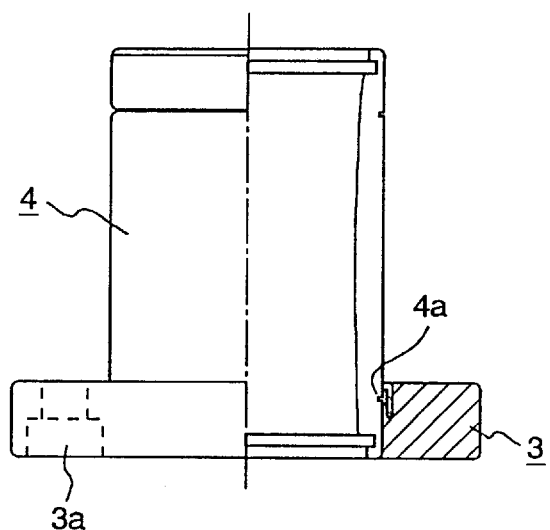
FIGS. 4(a) and 4(b), similar to FIGS. 3(a) and 3(b), illustrating a state in which the claws are inserted in a claw insertion hole and a ring is inserted in the recess.
Figure 4B:
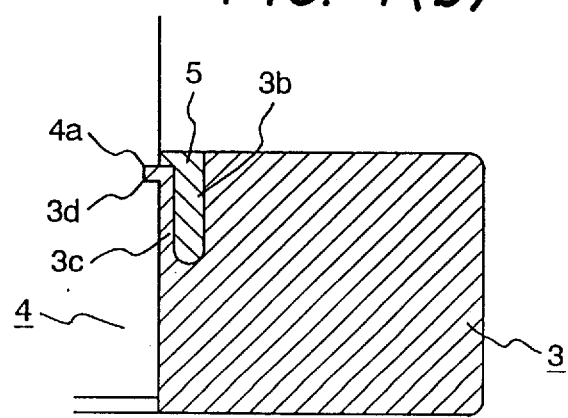

FIG. 1 is a perspective view of the linear ball bearing with a flange according to the present invention; FIG. 2 is a sectional view taken on line A—A in FIG. 1; and FIGS. 3(a), 3(b) and FIGS. 4(a), 4(b) are sectional views of the linear ball bearing with a flange according to the present invention, illustrating one embodiment of a method of fabricating the linear ball bearing with a flange, wherein FIGS. 3(a), 4(a) show the entire configuration of the linear ball bearing with a flange, and FIGS. 3(b), 4(b) show, on an enlarged scale, an essential portion of the linear ball bearing with a flange. In these figures, reference numeral 3 indicates a flange (or flange-shaped structure) made from a synthetic resin; 3a is a mounting hole used for mounting the linear ball bearing with a flange to a machine or apparatus; 3b is an annular recess formed in such a manner as to extend from one end surface of the flange 3 along the inner peripheral surface of the flange 3; 3c is a projection of an inner peripheral wall having a jagged structure in which projections and recesses are alternately arranged along the circumferential direction of the annular recess 3b; 3d is a claw (locking claw) provided at the leading end of the projection 3c in such a manner as to project inward from the inner peripheral wall; 4 is an outer cylinder of the linear ball bearing; 4a is a claw insertion hole (annular groove) provided at each end portion of the outer cylinder of the linear ball bearing, and it is generally formed in an outer cylinder of a commercially available linear ball bearing of a type having no flange; and 5 is a claw fixing ring.

Namely, the above-described linear ball bearing mounting flange is composed of the thick flange 3 made from a synthetic resin (for example, carbon-containing polyacetal resin) separately from the outer cylinder 4 of the linear ball bearing, in which the annular recess 3b extends from one end surface of the flange 3 along the inner peripheral surface thereof; the inner peripheral wall of the recess 3b has the jagged structure extending along the circumferential direction of the recess 3b; and the leading end of each projection of the jagged structure has the claw 3d projecting inward from the inner peripheral wall.

The flange made from a carbon-containing polyacetal resin, which is excellent in elasticity and sliding characteristic, can be precisely manufactured at a low cost.

The flange 3 is mounted around the outer cylinder 4 of the linear ball bearing in accordance with the following procedure. First, as shown in FIGS. 3(a), 3(b), one end surface side of the flange 3 on which the claws 3d are provided, is pressed to one end surface of the outer cylinder 4 of the linear ball bearing. At this time, the claws 3d are retreated by spring-back in the annular recess 3b provided behind the claws 3d, and consequently, the flange 3 is moved along the outer surface of the outer cylinder 4 of the linear ball bearing. When the claws 3d reach the position of the claw insertion hole 4a of the outer cylinder 4 of the linear ball bearing, they are inserted in the claw insertion hole 4a, so that the flange 3 is locked around the outer cylinder 4 of the linear ball bearing by insertion of the claws 3d in the claw insertion hole 4a.

Next, as shown in FIGS. 4(a), 4(b), the claw fixing ring 5 is press-fitted in the recess 3b of the flange 3, so that the flange 3 is rigidly fixed, that is, integrated to the outer cylinder 4 of the linear ball bearing in a state that the claws 3c are pressed to the outer cylinder 4 of the linear ball bearing by the claw fixing ring 5.

Although the linear ball bearing mounting flange shown in FIG. 1 has four pieces of the claws 3d, the number of the claws can be suitably selected in consideration of the spring-back effect of the claws. The height of the projection can be also suitably selected as needed. In addition, although the linear ball bearing mounting flange shown in FIG. 1 is formed into a circular external shape, it may be formed into a symmetric external shape such as a triangular or square external shape, and further it can be formed in an asymmetric external shape as needed.

Figure 5:
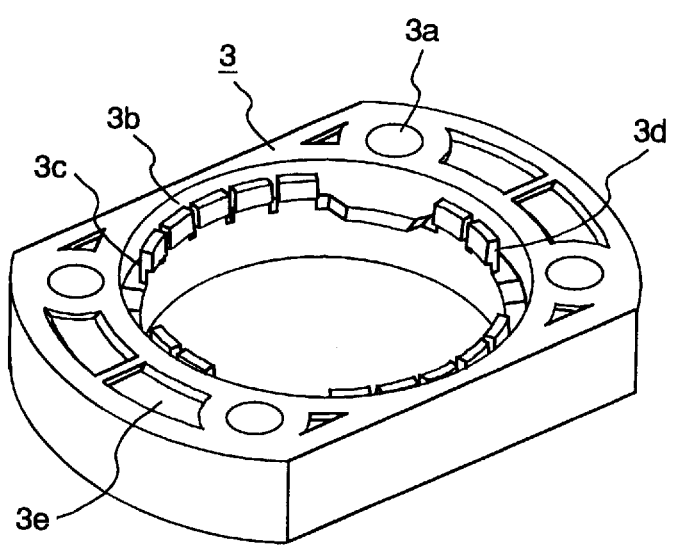
FIG. 5 is a perspective view of another embodiment of the linear ball bearing with a flange according to the present invention.
Figure 6:
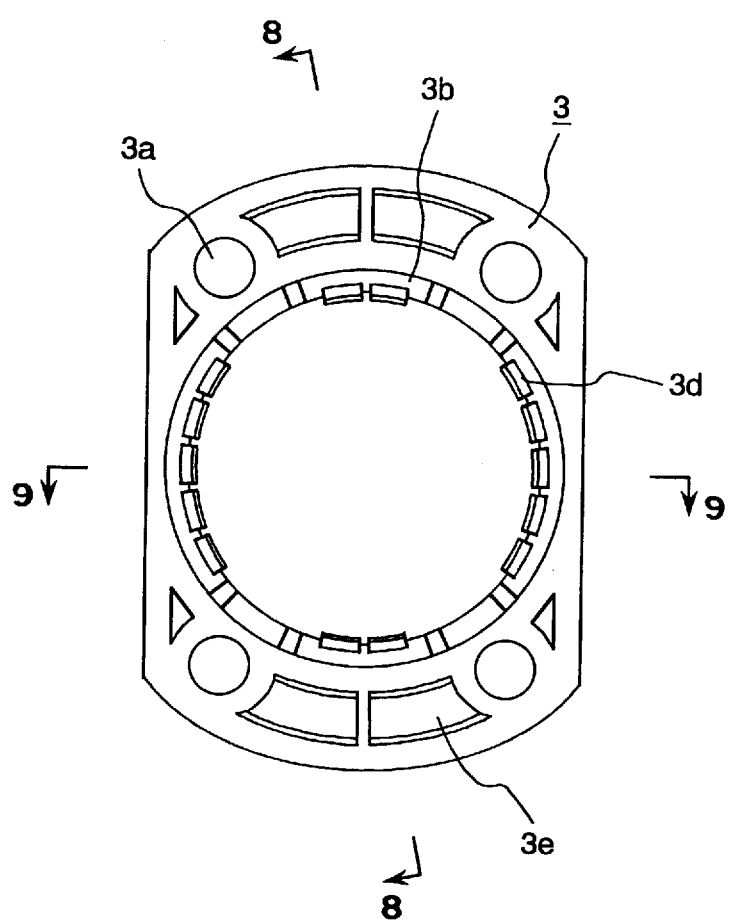
FIG. 6 is a front view of FIG. 5.
Figure 7:
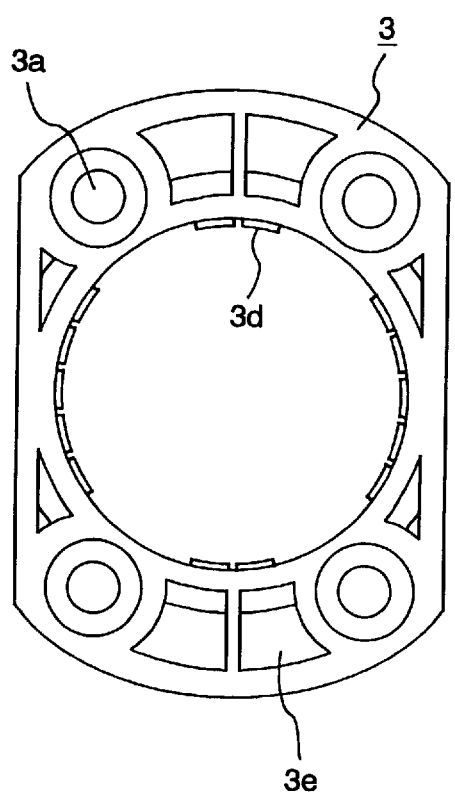
FIG. 7 is a rear view of FIG. 5.
Figure 8:
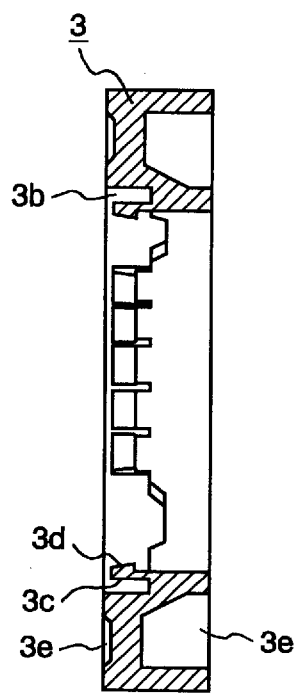
FIG. 8 is a sectional view taken on line A—A of FIG. 6.
Figure 9:
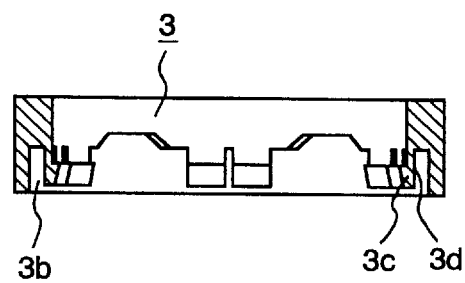
FIG. 9 is a sectional view taken on line B—B of FIG. 6.
Figure 10:
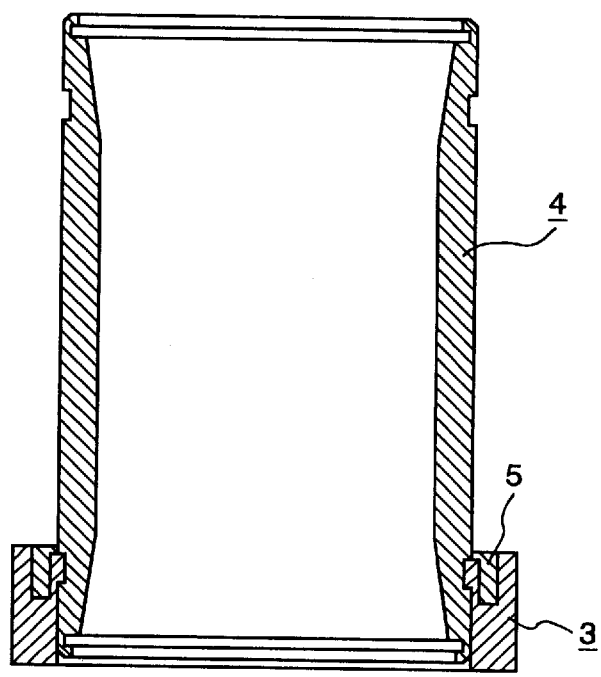
FIG. 10 is a sectional view showing a state in which the linear ball bearing with a flange shown in FIG. 5 is practically used.
Figure 11A:
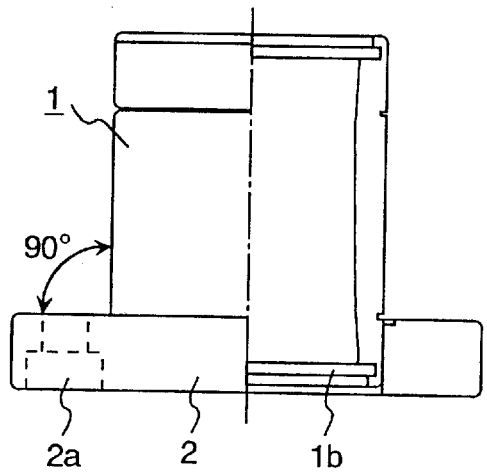
FIGS. 11(a), 11(b) are views illustrating a prior art method of fabricating a linear ball bearing with a flange.
Figure 11B:
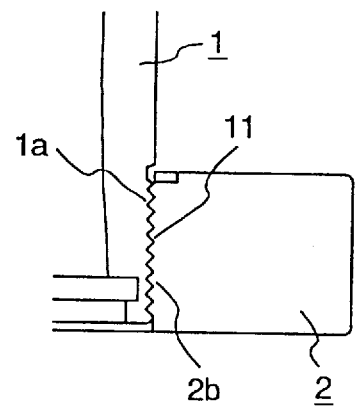
Figure 12A:
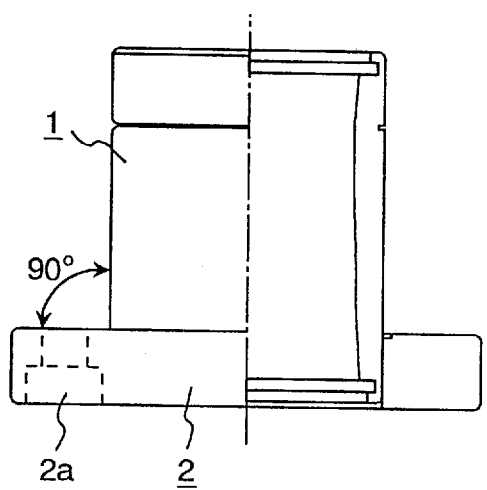
FIGS. 12(a), 12(b) are views illustrating another prior art method of fabricating a linear ball bearing with a flange.
Figure 12B:
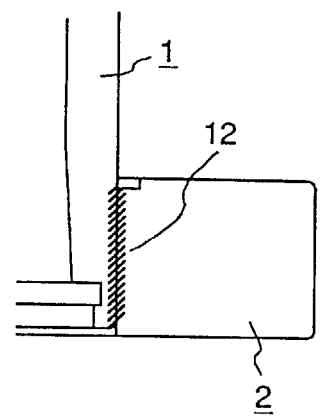

FIGS. 5 to 10 show such a modification of the linear ball bearing mounting flange according to the present invention, wherein FIG. 5 is a perspective view; FIG. 6 is a front view; FIG. 7 is a rear view; FIG. 8 is a sectional view taken on line A—A; FIG. 9 is a sectional view taken on line B—B, and FIG. 10 is a sectional view showing a state that the linear ball bearing mounting flange is practically used. As in the previous figures, reference numeral 3 indicates a flange; 3a is a mounting hole; 3b is an (annular) recess; 3c is a projection of a peripheral wall; and 3d is a claw. And, reference numeral 3e is a recess provided in the flange 3.

The flange 3 in this modification has a partially circular shape in a front view, in which two circular-arc portions are cut off from a circular shape by two straight lines parallel to each other. Such a flange 3 has 14 pieces of the claws 3d in total: five pieces on each straight line side; and two pieces on each circular-arc side. Moreover, to reduce the weight, the flange 3 has recesses 3e in the surface portion except for the mounting holes 3a for mounting the flange 3 to a machine or apparatus.

A plurality of the flanges having such a configuration can be disposed in proximity to each other, and accordingly, they can effectively used in the case where a plurality of linear ball bearings are required to be mounted in proximity to each other.

In addition, there may be adopted such a configuration that an annular projection, having an inside diameter slightly smaller than the outside diameter of the outer cylinder 4 of the linear ball bearing, for locking the flange 3 on an end surface of the outer cylinder 4 is provided on an end surface side of the flange 3 on which the annular recess 3b is not provided.

The linear ball bearing mounting flange according to the present invention, which is made from a synthetic resin, can be simply, easily manufactured at a low cost; and consequently, the linear ball bearing with a flange can be simply, easily manufactured at a low cost.

In the linear ball bearing with a flange according to the present invention, when the flange 3 is mounted around the outer cylinder 4 of the linear ball bearing, the claws 3c for fixing the flange 3 to the outer cylinder 4 are retreated by the spring-back effect in the recess 3b formed in a mounting surface of the flange 3 for mounting the flange 3 to the outer cylinder 4 and are inserted in the claw insertion hole of the outer cylinder 4, so that the flange 3 is easily integrated with the outer cylinder 4. Accordingly, the linear ball bearing with a flange according to the present invention solves the problems of the prior art linear ball bearing with a flange which is mounted by screwing or brazing, and further it eliminates provision of a member such as a brazing material.

The method of fabricating the linear ball baring with a flange according to the present invention solves not only the problems of the prior art fabrication method by screwing or brazing, but also other general problems caused by the integration of the flange with the linear ball bearing, for examples, the above-described problems that the outer periphery of the linear ball bearing cannot be continuously ground because of the presence of the flange; the assembling direction is limited because of the presence of the flange, resulting in the degraded workability; and since the linear ball bearing integrated with the flange has a T-shape, it is difficult to align the linear ball bearings in line because of the unspecified postures when being transferred between fabrication steps. Moreover, the linear ball bearing with a flange fabricated by the method of the present invention is advantageous for heat-treatment on a large scale because only an outer cylinder of a linear ball bearing can be heat-treated and thereby takes a space smaller than that required for an outer cylinder integrated with a flange.

The linear ball bearing mounting flange according to the present invention, which is light in weight because the flange is made from a resin, is advantageous in that it can be simply, easily manufactured at a low cost.

Additionally, the linear ball bearing mounting flange of the present invention can simply, easily mounted on a linear ball bearing of a type having no flange.

What is claimed is:

1. A linear ball bearing mounting flange, which is provided on at least one end of an outer cylinder of a linear ball bearing and is used for mounting said linear ball bearing on a machine or apparatus, said flange comprising:
 a flange-shaped structure having a thick wall and provided separately from said outer cylinder, said flange-shaped structure having an annular recess extending from one end surface of said flange-shaped structure along the inner peripheral surface thereof; a peripheral wall on the inner peripheral side of said recess, which has a jagged structure in which projections and recesses are alternately arranged along the circumferential direction; and a locking piece projecting inward from said inner peripheral wall, which is formed at the leading end of each of said projecting portions of said jagged structure.

2. A linear ball bearing mounting flange according to claim 1, wherein said flange-shaped structure has at least three pieces of said projecting portions.

3. A linear ball bearing mounting flange according to claim 1, wherein said flange-shaped structure has a partially circular shape in a front view, in which two circular-arc portions are cut off from a circular shape by two straight lines parallel to each other.

4. A linear ball bearing mounting flange according to any one of claims 1 to 3, wherein said flange-shaped structure is made from a synthetic resin.

* * * * *